United States Patent
Chen

(10) Patent No.: US 11,165,721 B1
(45) Date of Patent: Nov. 2, 2021

(54) REPROGRAMMING MULTICAST REPLICATION USING REAL-TIME BUFFER FEEDBACK

(71) Applicant: Arista Networks, Inc., Santa Clara, CA (US)

(72) Inventor: Michael Kerby Chen, Palo Alto, CA (US)

(73) Assignee: Arista Networks, Inc., Santa Clara, CA (US)

( * ) Notice: Subject to any disclaimer, the term of this patent is extended or adjusted under 35 U.S.C. 154(b) by 93 days.

(21) Appl. No.: 16/844,789

(22) Filed: Apr. 9, 2020

(51) Int. Cl.
  *H04L 12/26* (2006.01)
  *H04L 12/861* (2013.01)
  *H04L 12/935* (2013.01)
  *H04L 12/931* (2013.01)

(52) U.S. Cl.
  CPC ........ *H04L 49/9084* (2013.01); *H04L 49/201* (2013.01); *H04L 49/3027* (2013.01); *H04L 49/3045* (2013.01)

(58) Field of Classification Search
  CPC . H04L 47/12; H04L 49/9084; H04L 49/3045; H04L 49/3027; H04L 49/201
  USPC ........................................................ 370/229
  See application file for complete search history.

(56) References Cited

U.S. PATENT DOCUMENTS

| | | | |
|---|---|---|---|
| 6,751,219 B1* | 6/2004 | Lipp ..................... | H04L 49/201 370/390 |
| 10,547,560 B1* | 1/2020 | Patel ................... | H04L 43/0852 |
| 2002/0012344 A1* | 1/2002 | Johnson ............... | H04Q 3/5455 370/389 |
| 2006/0165111 A1* | 7/2006 | Varma ...................... | H04Q 3/68 370/428 |
| 2009/0059921 A1* | 3/2009 | Dong .................... | H04L 49/201 370/390 |
| 2014/0064081 A1* | 3/2014 | Morandin ........... | H04L 43/0882 370/235 |
| 2015/0207638 A1* | 7/2015 | Basso ................... | H04L 49/101 370/230 |
| 2017/0222881 A1* | 8/2017 | Holbrook ............ | H04L 43/0835 |
| 2017/0339075 A1* | 11/2017 | Arad ................... | H04L 49/9084 |
| 2018/0278498 A1* | 9/2018 | Zeng ..................... | H04L 43/045 |
| 2018/0287907 A1* | 10/2018 | Kulshreshtha ........ | H04L 41/064 |
| 2020/0296057 A1* | 9/2020 | Mula ....................... | H04L 47/15 |

* cited by examiner

*Primary Examiner* — Robert J Lopata
(74) *Attorney, Agent, or Firm* — Fountainhead Law Group P.C.

(57) ABSTRACT

Methods and systems are described for programming a substitution of ingress replication buffering for egress replication buffering after identifying egress buffer errors (such as overflow) for multicast traffic. A network element is configured to identify which ports drop packets by monitoring egress buffers and/or multicast traffic in real time. A hardware forwarding engine provides feedback to a control plane processor of the network element to adapt and selectively reprogram multicast ingress replication, temporarily, for certain egress ports that may have, e.g., egress buffer errors or risk of issues due to high network traffic. Using virtual output queues in ingress buffers may reduce risk of egress port congestion, as egress buffers have more limited resources than ingress buffers; however, relying solely on ingress replication for multicast traffic may hinder unicast traffic. Ingress buffer replication of multicast traffic may be used selectively and temporarily.

22 Claims, 7 Drawing Sheets

REPROGRAMMING MULTICAST REPLICATION USING REAL-TIME BUFFER FEEDBACK

BACKGROUND

The present disclosure relates generally to data networking and more particularly to multicast replication buffering.

SUMMARY

Network elements, such as a switches or routers, are typically configured to buffer unicast and multicast transmissions during forwarding. With unicast transmissions (e.g., transmissions of a data packet to a single address), a network element receives a packet at an interface, typically uses ingress buffering until the identified output port is available to receive the packet, and forwards the packet. For instance, a network element may receive a packet at a port, look up the destination port, buffer the packet in a queue at the ingress, and forward the packet from the queue to the appropriate output port. Virtual Output Queuing (VOQ) is a scheduling mechanism that may be used by a network element to manage an ingress buffer as multiple queues with each queue corresponding to an output interface. Employing VOQ, one or more network data processors (e.g., an Application Specific Integrated Circuit (ASIC)) may hold received packets in virtual queues corresponding to the destination port of each packet until it receives a notification that the appropriate output port is able to receive. It then forwards the next packet in the corresponding queue to the output port.

With multicast traffic, a network element may receive a unit of network data (e.g., a packet) with a destination of a multicast group, look up and identify output ports belonging to the multicast group, replicate the packet, and forward the replicated packets to each destination port associated with a destination in the multicast group. Replication of a multicast packet typically takes place on the egress side of traffic forwarding. For example, in fabric-egress replication, a network element may receive a multicast packet at a port, forward the packet to the crossbar switch fabric for replication. With the packet in the fabric, the network element identifies the destination output ports, replicates the packet, and forwards the copies to an egress buffer of each identified destination output port. As another example, in ingress-egress replication, a network element may receive a multicast packet at a port, identify egress replication ports (ERPs) that are logical ports representing the destination output ports, replicate the packet at the ingress buffer for each ERP, and forward the replicated packets to ERPs. Each ERP replicates and forwards the packets to an egress of each destination output port in the multicast group.

Utilizing fabric-egress replication with multicast traffic, egress replication buffering is generally preferred over ingress replication buffering. This is because replicating a packet at an ingress buffer would require transmission of each copy from the ingress over a network element's fabric. The fabric would experience much higher data traffic. Moreover, replicating a packet and queueing duplicate packets in VOQ buffers may cause congestion at an ingress and hinder unicast traffic. By transmitting only one packet through the fabric before replication, egress replication buffering can minimize memory and bandwidth use in multicast transmissions. Egress buffers, however, typically lack large resources and can fill up quickly with bursts of traffic during periods of congestion or traffic microbursts. Egress buffer overflow can be a significant cause of dropped packets during multicast transmission.

Described herein are various approaches for programming a substitution of ingress replication buffering for egress replication buffering after identifying egress buffer errors (such as overflow) for multicast traffic. A network element is configured to identify which ports drop packets by monitoring egress buffers and/or multicast traffic in real time. An ASIC provides feedback to a CPU of the network element to adapt and selectively reprogram multicast ingress replication for certain egress ports that may have, e.g., egress buffer errors or issues.

In some embodiments described herein feedback is an interrupt sent by hardware to indicate an error such as buffer overflow. In other described embodiments feedback may identify a near real time probability of potential error. For example, network traffic monitoring, such as capturing packets or mirroring traffic, may provide feedback of traffic bursts. VOQ performance may require a loop of requests and credits before forwarding a packet and monitoring VOQs may provide feedback describing the state of egress buffers. Some embodiments may use a combination of different forms of feedback. By responding to feedback, especially with real-time or near real-time feedback, a network element may use multicast ingress replication in lieu of egress replication only as needed to optimize the limited ingress and egress buffer resources.

For embodiments where an interrupt informs a CPU in real time about an egress buffer overflow on a specific port, the CPU can reprogram a network element to avoid using egress replication buffering when handling multicast traffic. For instance, a network element may begin to use ingress-only replication buffering for multicast traffic destined to a port experiencing a buffer error. Substituting ingress buffer replication for egress buffer replication upon detection of buffer overflow would allow the egress buffer to empty. Transmitting many copies of multicast packets across the fabric of a network element could, however, burden resources and disturb unicast network traffic. In some embodiments described herein, ingress replication buffering for multicast traffic is used for a limited time, e.g., until overrun egress buffers empty.

Additionally, a network element may temporarily switch to VOQ buffering for multicast traffic after a port suffers buffer overflow while egress replication buffering. For instance, if an interrupt informs a network element in real time about an egress buffer overflow on a specific output interface, the network element can reprogram multicast traffic to conditionally use ingress replication buffering for the corresponding output interface. Multicast traffic congestion and/or disruption of unicast traffic in the network element would be minimized by reprogramming ingress replication buffering for only the problematic ports and allowing interfaces without errors to continue egress replication buffering.

Reprogramming multicast groups to utilize ingress replication buffering in response to receiving feedback of egress buffer overrun allows a network element to suffer fewer packets dropped and better utilization of limited ingress buffers, egress buffers, and network element bandwidth.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Methods and systems for reprogramming multicast replication buffering in a network element are described herein. Network elements, including as switches, routers, hubs, bridges, gateways, integrated circuits, forwarding hardware, etc., are typically configured to buffer unicast and multicast transmissions during forwarding. A term "packets" may be used, but is not meant to be limiting as network data transmitted via a network element may be a stream of network frames, datagrams or data packets, or other types of discretely switched network data.

In some implementations of a network element, multiple network data processors (e.g., fabric access processors) may be used to manage ingress and/or egress of network data units from port groupings of a network element. Network data processors may be configured to handle the ingress of network data into a network element or the egress of data out of a network element, where each ingress network data processor can include a VOQ for each egress port in the whole system.

A network element handles a replicated multicast data unit very similarly to the way a unicast packet is forwarded after (temporarily) reprogramming multicast replication buffering from egress replication to ingress packet replication and buffering, using virtual output queues (VOQs) corresponding to each output port. Using ingress replication for multicast traffic for a limited time may reduce packet loss within network elements during times of risk of an egress buffer error (e.g., buffer overflow) when compared to egress replication and buffering.

To provide a thorough explanation of the various embodiments, numerous specific details are set forth herein. However, one having ordinary skill in the art will understand that embodiments may be practiced without these specific details. In some instances, well-known components, structures, and techniques are not shown in detail to avoid obscuring key details within this description.

The processes depicted in the figures that follow are performed by processing logic that comprises hardware (e.g., circuitry, dedicated logic, etc.), software (such as is run on a general-purpose computer system or a dedicated or specialized machine), or a combination of both. Although some of the processes are described below in terms of sequential operations, it should be appreciated that some of the operations described may be performed in a different order and/or in parallel.

Network System and Network Elements

Figure 1:
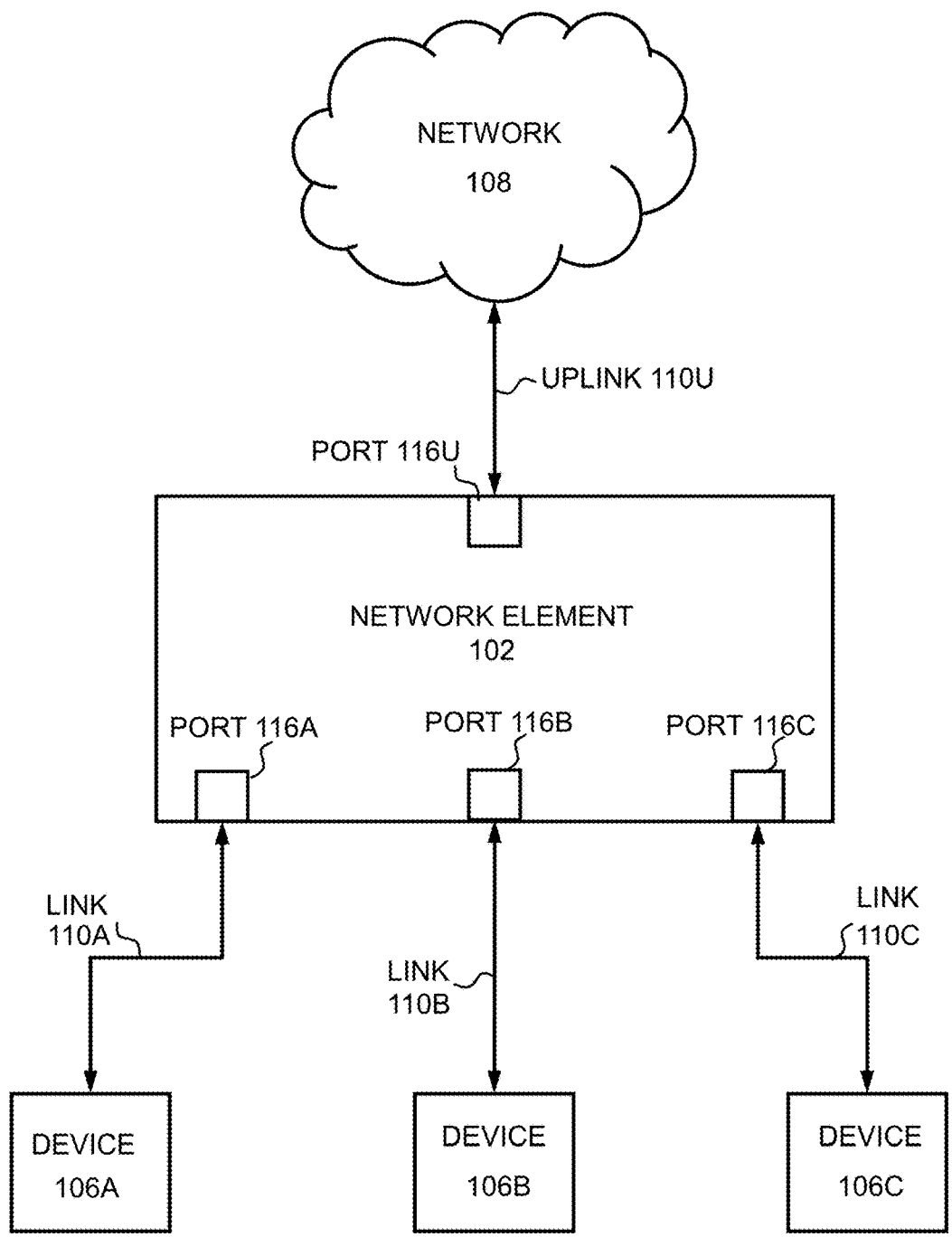
FIG. 1 depicts a block diagram of a system that may include a network element communicating network data between a network and a number of devices, in accordance with some embodiments of the disclosure.

FIG. 1 depicts a block diagram of a network system 100 that includes a network element 102 communicating network data between a network 108 and a number of devices, e.g., devices 106A-C, in accordance with some embodiments of the disclosure. In various embodiments, network element 102 may be one or more of a switch, router, hub, bridge, gateway, etc., or any type of device that provides access to a network 108 (e.g., physical network, virtualized network, etc.). In some embodiments, network element 102 can be a virtual or a physical network element. In some embodiments, network element 102 couples to network 108 via an uplink 110U coupled to an uplink port 116U to provide network connectivity to devices 106A-C via respective links 110A-C coupled to ports 116A-C. Uplink port 116U and uplink 110U may be configured for a high-speed wired connection (e.g., copper, fiber, etc.) that, in some embodiments, may provide increased throughput capability relative to ports 116A-C and links 110A-C. The respective links 110A-C between network element 102 and devices 106A-C may also be wired connections. However, in some embodiments, uplink 110U and/or links 110A-C may be created over alternate connection types such as wireless connections or a combination of wired and wireless connections.

In some embodiments, such as network system 100, devices 106A-C may be any type of devices that can communicate network data with another device, such as a personal computer, laptop, or server. Each of devices 106A-C can also be a mobile device (e.g., phone, smartphone, personal gaming device, etc.), or another network element. In some embodiments, each of devices 106A-C may be a virtual machine or may be a device that hosts one or more virtual machines.

In various embodiments, such as network system 100, different types of protocols can be used to communicate network data over the connection (e.g., Ethernet, wireless, Synchronous Optical Networking (SONET), Fiber channel, Infiniband, etc.). The network data being communicated by network element 102 can be a stream of network frames, datagrams or data packets, or other types of discretely switched network data. In some embodiments, such as network system 100, network element 102 communicates network data between the devices 106A-C and network 108 or between devices 106A-C using a variety of communicating techniques (e.g., layer 2 switching, layer 3 routing, traffic shaping, applying a quality of service (QoS) policy, etc.).

In network system 100, for example, network element 102 may be part of a region within a larger network topology, where the devices 106A-C are grouped within a separate network region as other devices coupled to network 108.

Network regions can be configured to allow physical or virtual grouping of network endpoints, such as specific network stations, devices, trunks, media gateways, or protocol groups such as Internet Protocol groups within an enterprise network.

With unicast transmissions in network system 100, network element 102 receives a packet at an ingress port, e.g., port 116U, and may buffer the packet until the identified output port is available to receive the packet before forwarding the packet to the egress port, e.g., one of ports 116A-C.

With multicast traffic in network system 100, network element 102 receives a packet with a destination of a multicast group, accesses tables to identify output ports belonging to the multicast group, e.g., one or more of ports 116A-C, replicates the packet, and forwards the replicated packets to the identified output ports.

Dropped packets may be a problem of any network element. Network element 102 may be configured to identify which ports, e.g., ports 116A-C, drop packets by monitoring egress buffers and/or multicast traffic in real time, as further described below.

Figure 2:
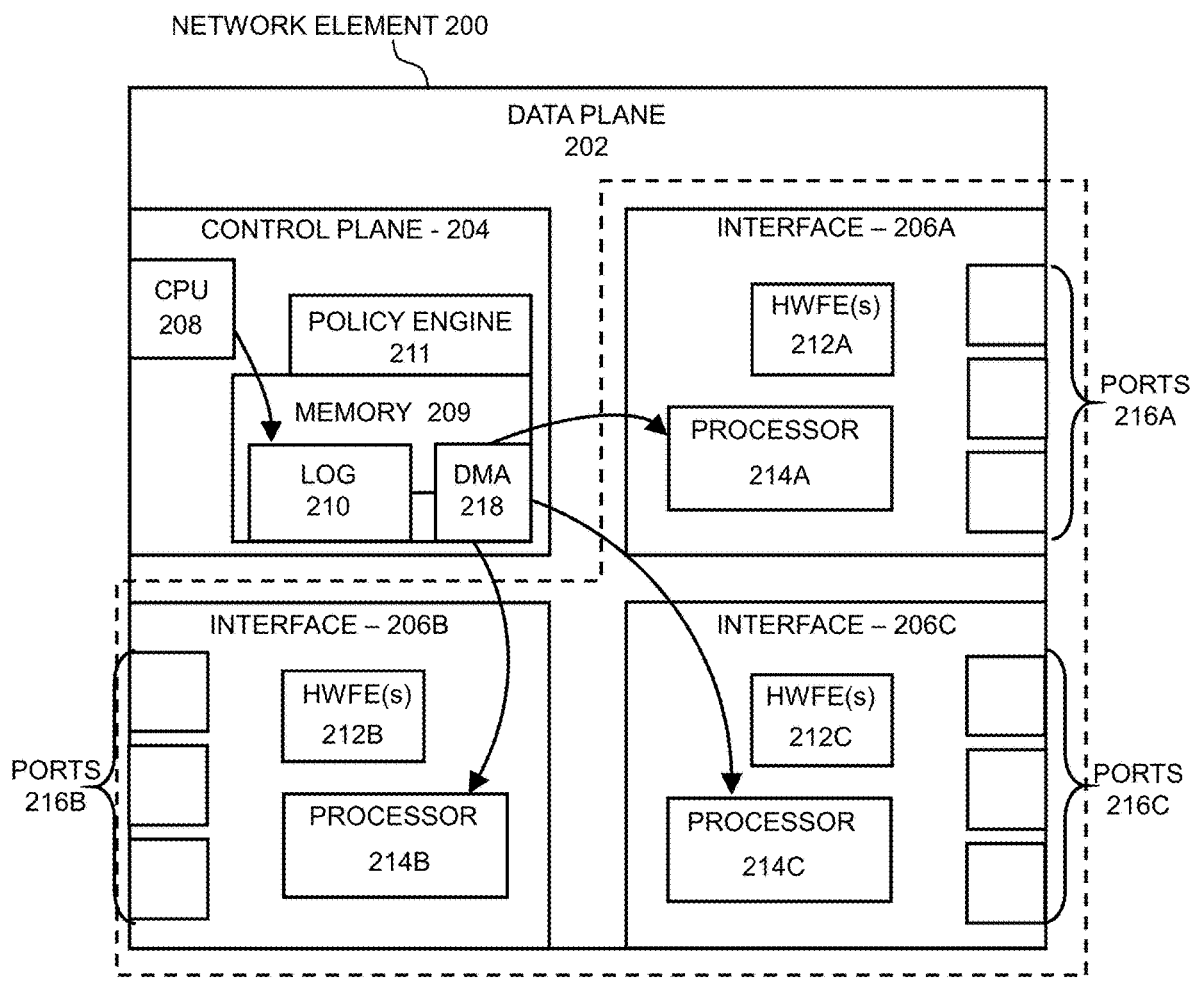
FIG. 2 depicts an illustrative block diagram of a network element including a data plane coupled to a control plane and several interface devices, in accordance with some embodiments of the disclosure.

FIG. 2 depicts an illustrative block diagram of a network element 200 that includes a data plane 202 coupled to a control plane 204 and several interface devices 206A-C, in accordance with some embodiments of the disclosure. In some network elements, data plane 202 may be referred to as the forwarding plane. In some embodiments, illustrated network element 200 may be an example of a component in system 100 in FIG. 1, such as network element 102.

In some embodiments, control plane 204 includes central processing unit (CPU) 208 and memory 209 to store data. CPU 208 may comprise multiple processors. As discussed herein, CPU 208 may also be referred to as a control plane processor of network element 200. CPU 208 may be used to process information for the control plane 204 and writes configuration data for hardware forwarding engines 212A-C in the network interface devices 206A-C. Additionally, CPU 208 may read data from hardware forwarding engines 212A-C using log 210.

Information processed by CPU 208 may include, for example, control plane network data corresponding to a plurality of different classes of control plane traffic, such as routing protocol messages, routing table messages, programming messages (e.g., packets from a controller instructing the programming of a network element), and/or messages used to collect traffic diagnostics. CPU 208, in in embodiments such as network element 200, processes control plane network data to perform control management updates and/or respond with control message responses (e.g., routing decisions, protocol updates, traffic resolutions, etc.).

In network element 200, data plane 202 receives, processes, and forwards network data, including control plane network data, using various configuration data (e.g., forwarding, security, quality of service (QoS), and other network traffic processing information). Data plane 202 may include multiple network interface devices 206A-C (e.g., switches, routers, network line cards, etc.) that can each receive, process, and/or forward network traffic. Each of interface devices 206A-C may include multiple ports 216A-C used to receive and transmit network data.

For each unit of network data (e.g., a packet) received by network element 200, data plane 202 determines a destination address for the network data, looks up the requisite information for that destination in one or more tables stored in the data plane, and forwards that network data via the proper outgoing interface, such as one of the interface devices 206A-C.

As depicted in network element 200, each interface device 206A-C may include one or more hardware forwarding engines (HWFE) 212A-C, processors 214A-C, and ports 216A-C, respectively. Each HWFE 212A-C may forward data (e.g., data packets) for network element 200, such as performing routing, switching, and/or other types of network forwarding. Each processor 214A-C may be used to accelerate various functions of corresponding interface devices 206A-C. For example, processor 214A may program a corresponding HWFE 212A and/or push data from HWFE 212A to CPU 208 in control plane 204. For example, in some embodiments, processors 214A-C can read and write from log 210 in control plane 204 to program corresponding HWFEs 212A-C. Processors 214A-C may push data from HWFEs 212A-C to CPU 208 in control plane 204 via log 210. Traffic data and errors may be communicated this way. Each of processors 214A-C may comprise one or more processors and/or application-specific integrated circuits (ASICs).

In some embodiments, control plane 204 may gather configuration data for hardware forwarding engines 212A-C in control plane network data messages from different sources and may push this configuration data to hardware forwarding engines 212A-C. Such sources may be, e.g., locally stored configuration data, via a command line interface, or other management channel (e.g., SNMP (Simple Network Management Protocol), Simple Object Access Protocol (SOAP), Representational State Transfer type Application Programming Interface (RESTful API), Hypertext Transfer Protocol (HTTP), HTTP over Secure Sockets layer (HTTPs), Network Configuration Protocol (NetConf), Secure Shell (SSH), and/or another management protocol. Control plane 204 may and push configuration data to hardware forwarding engines 212A-C using log 210.

In some embodiments, such as network element 200, memory 209 may be used to store data for control plane 204 and may be shared with data plane 202. In such an embodiment, a direct memory access (DMA) controller 218 may be coupled to memory 209 to allow processors 214A-C direct access to memory 209. In some embodiments, DMA controller 218 may allow processors 214A-C to each directly access log 210 without requiring CPU 208 in control plane 204 to send data to each processor 214A-C.

In some embodiments, control plane 204 may include a policy engine 211 to apply a QoS policy to network traffic flowing through network element 200. Policy engine 211 can be configured to minimize latency of some type of network traffic, or to apply traffic shaping policies on the overall flow of traffic through the network element, or within a larger network topology. Proper determination of real-time latency data within the network can be key to the implementation of effective QoS policy. In some embodiments, logic to perform timing of network data flow may be incorporated into hardware of data plane 202 of each network element 200. Policy engine 211 may apply shaping (e.g., a maximum allowable rate) and bandwidth (e.g., a minimum throughput rate for a message queue) policies to each virtual output queue. Furthermore, each message class may have its own control plane forwarding policy and policies enforced based on message class.

In some embodiments, for each port of each interface, two or more virtual output queues (VOQs) for control plane network data are maintained in a memory, such as buffers of interface devices 206A-C. The two or more output queues group control plane network data based on traffic type, such as class of control plane network data message, for selection and forwarding to CPU 208. In some embodiments, for each port of each interface, one virtual output queue may be maintained for each message class. Thus, in some embodiments, the total number of control plane virtual output queues for a network element can be the number of ports per interface, times the number of interfaces, times the number of message classes.

Typically, with multicast traffic transmitted via network element 200, fabric-egress replication is used to replicate and buffer data units (e.g., packets) when forwarding to multiple output ports. For instance, an input port, e.g., one of ports 216A, may receive a packet with a destination of a multicast group. In fabric-egress replication, the packet is forwarded to the fabric and data plane 202 determines one or more destination addresses for the network data. Data plane 202 may determine destination addresses by accessing one or more tables stored in the data plane and identifying output ports, e.g., one or more of ports 216B-C belonging to the multicast group. The fabric replicates the packet and forwards the replicated packets to an egress buffer of each identified destination port, e.g., one or more of ports 216B-C, via the proper outgoing interface(s), e.g., interface devices 206A-C.

In some embodiments, ingress-egress replication may be used. In ingress-egress replication, after an input port, e.g., one of ports 216A, receives a multicast packet, the corresponding hardware forwarding engine, e.g., HWFE 212A, identifies egress replication ports (ERPs). ERPs are logical ports representing the destination output interfaces. The ingress hardware forwarding engine, e.g., HWFE 212A, replicates the packet for each ERP, and forwards the replicated packets to other interfaces, e.g., interface devices 206B-C, belonging to the multicast group. Each corresponding hardware forwarding engine, e.g., HWFE 212B-C, then may replicate and forward packets to egresses corresponding to output ports, e.g., ports 216A, if the ports are identified as destinations in the multicast group.

Network element 200 may be configured to identify which ports drop packets by monitoring egress buffers and/or multicast traffic in real time. Processors 214A-C may include ASICs that may be configured to provide feedback to control plane 204, e.g., via DMA controller 218 and/or log 210, if an corresponding HWFE 212A-C has an egress buffer error.

In the event of an egress buffer error, such as buffer overrun, multicast packet replication and buffering may be reprogrammed to occur at the ingress interface rather than the egress interface. Control Plane 204 may be programmed to adapt and selectively reprogram multicast ingress replication for certain egress ports that may have, e.g., egress buffer errors or issues.

Figure 3:
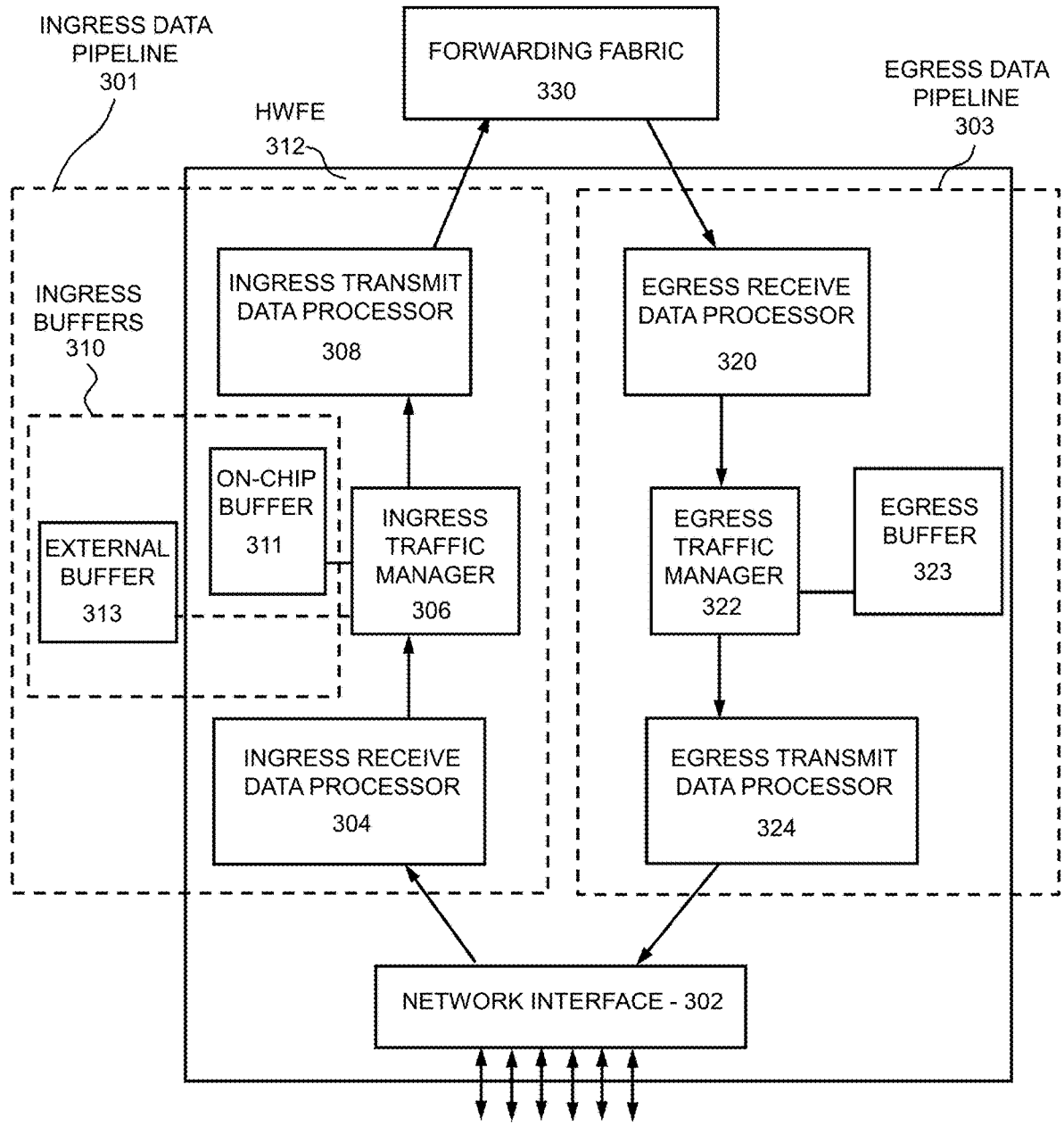
FIG. 3 depicts an illustrative block diagram of a forwarding pipeline for a network element, in accordance with some embodiments of the disclosure.

FIG. 3 depicts an illustrative block diagram of a forwarding pipeline for a network element, in accordance with some embodiments of the disclosure. In some embodiments, forwarding pipeline 300 resides in a hardware forwarding engine (e.g., HWFE 312), which may include logic from one or more of HWFE(s) 212A-C within each interface device 206A-C shown in FIG. 2.

Forwarding pipeline 300 may include, within HWFE 312, an ingress data pipeline (e.g., ingress data pipeline 301) and an egress data pipeline (e.g., egress data pipeline 303) working in concert to conduct the flow of network traffic. Traffic may flow from an ingress data pipeline to an egress pipeline on the same or a different hardware forwarding engines. For instance, network data units having an ingress port and an egress port on the same forwarding engine (e.g., HWFE 312) would not need to leave the forwarding engine. Forwarding pipeline 300 depicts network traffic passing through the forwarding fabric 330, as is typical in cases where the network data units have an ingress port and an egress port on different forwarding engines.

A network data unit in forwarding pipeline 300 may be buffered in memory within (or outside) HWFE 312 in order to manage network traffic and prevent data loss. Typically, with unicast transmissions (e.g., transmissions of a data packet to a single address), network interface 302 receives a packet and ingress data pipeline 301 uses ingress buffering (e.g., virtual output queueing) until the identified output port is available to receive the packet, and forwards the packet. With multicast traffic, however, buffering network data typically occurs in the egress data pipeline. In certain situations, such as when there is an egress buffer error or high risk of error due to traffic bursts, reprogramming the forwarding pipeline to replicate and buffer certain multicast traffic in the ingress data pipeline may minimize packet loss.

In forwarding pipeline 300, ingress data pipeline 301 includes ingress receive data processor 304, ingress traffic manager 306, ingress transmit data processor 308, as well as network interface 302. Ingress data pipeline 301 may include ingress buffers 310, which may include on-chip buffer 311, which resides in on-chip memory of HWFE 312. Additionally, external buffer 313 may also be included as part of ingress buffers 310 but may reside in memory of a network element that is outside of HWFE 312. External buffer 313 may reside in an array of high speed, low latency random access memory (RAM) coupled to HWFE 312 via a memory bus, which in some embodiments may be a multi-channel memory bus.

In forwarding pipeline 300, ingress data pipeline 301 of HWFE 312 works in concert with an egress data pipeline 303 residing within HWFE 312. Egress data pipeline 303 may include an egress receive data processor 320, an egress traffic manager 322, on chip memory storing an egress buffer 323, and and/or an egress transmit data processor 324, which couples to network interface 302. In some embodiments, such as forwarding pipeline 300, ingress data pipeline 301 and egress data pipeline 303 each couple with a forwarding fabric 330, which may include one or more crossbar switches that interconnect multiple interfaces (e.g., interface devices 206A-C as depicted in FIG. 2).

Network interface 302 may include a physical layer (e.g., layer 1) interface including one or more ports (e.g., ports 216 as depicted in FIG. 2). The physical layer is responsible for transmission and reception of bit streams across physical connections including encoding, multiplexing, synchronization, clock recovery and serialization of data on the wire for whatever speed or type of interface is configured. Network interface 302 may support combinations of various speeds, and ports may be combined into link aggregation groups using, for example, static link aggregation or link aggregation control protocol (LACP). In some embodiments, such as forwarding pipeline 300, optical (e.g., fiber optic) and electrical (e.g., copper) connections are supported.

Network interface 302 may also include data-link layer (e.g., layer 2) logic including media access control (MAC) and/or logical link control (LLC) logic. When a valid data stream is received at the physical layer, data can be passed on to the MAC portion of the data-link layer. In some embodiments, such as forwarding pipeline 300, the physical and data-link layer logic may comply with the IEEE 802.3 Ethernet standard, although other technologies may be supported. In embodiments supporting the Ethernet standard, the MAC portion may divide an incoming data stream into Ethernet frames, although techniques described herein may apply to equivalent network data units of other protocols and standards.

While forwarding pipeline 300 illustrates specific individual logic elements within ingress data pipeline 301 and egress data pipeline 303 of HWFE 312, other logic elements within forwarding pipeline 300 for network data within a hardware forwarding engine of a network element may generally perform equivalent or similar functions.

Network interface 302 can couple with ingress receive data processor 304, which may include forwarding logic for incoming network data. In some embodiments, ingress receive data processor 304 logic may be flexible and can be configured to support new protocols and forwarding methods as they become available. Ingress receive data processor 304, in some embodiments, can parse headers of incoming network data units and extract fields used to make forwarding decisions, such as data-link layer source and destination addresses (e.g., MAC addresses), VLAN headers, or network layer (e.g., layer 3) source and destination addresses and/or port numbers. Ingress receive data processor 304 may perform forwarding at the data-link layer or network layer based on address information in network data unit headers.

For example, a network data unit having a destination MAC address corresponding to the MAC address of the ingress network interface (e.g., network interface 302) may be forwarded using the network layer header address information for the layer 3 protocol (e.g., Internet Protocol, etc.) in use by network data. Otherwise, a network data unit having a destination MAC address that differs from the address of the ingress network interface may be forwarded to an egress port associated with the indicated destination MAC address.

For data-link layer forwarding, the destination MAC address for a given ingress unit of network data can be referenced against a lookup table populated with MAC addresses discovered or configured within the data-link layer sub-network of the ingress network data. The unit of network data may then be forwarded to the port associated with the indicated destination MAC address. If the destination MAC address lookup fails, the unit of network data may be flooded to all ports within the indicated data-link layer sub-network.

In some embodiments, forwarding logic within ingress receive data processor 304 may also perform a table lookup based on the source data-link layer or network-layer address. For example, forwarding logic can add an entry for the source MAC address of a unit of network data received from network interface 302 if the source MAC address does not exist in the forwarding table. Where unicast reverse path forwarding (uRPF) is enabled for the network layer forwarding logic, a lookup can be performed to determine if the unit of network data has network layer source address information that is known to be valid for the ingress interface. In the case of invalid source address information, the unit of network data may be dropped, for example, to mitigate address spoofing.

In some embodiments, VLANs are supported when performing data-link layer forwarding. When VLANs are in use, data-link layer domains may be partitioned to create multiple distinct broadcast domains that are mutually isolated. In some embodiments, network data units associated with a specific VLAN can be tagged such that multiple devices may operate within the same virtual sub-network broadcast domain even though those devices are physically connected to different sub-networks. Alternatively, multiple virtual private LANs may be configured to operate on the same physical data-link layer, such that broadcast traffic may be isolated within each virtual private LAN. For VLAN data-link layer forwarding, the destination MAC address for a given ingress unit of network data can be referenced against a lookup table populated with MAC addresses discovered or configured within the indicated VLAN of the ingress network data. Should the lookup fail, the network data may be flooded to all ports within the VLAN, subject to any storm-control thresholds that may be configured in some embodiments.

Network layer forwarding may be performed in a manner similar to data-link layer forwarding, and may be performed using at least one common lookup table, excepting that network-layer address data, rather than data-link address data, may be used to make forwarding decisions. In some embodiments, such as forwarding pipeline 300, for network layer and data-link layer forwarding, multiple different types of lookup tables can be used, with a best match from the combined lookups providing the forwarding result. In some embodiments, equal cost multi-path (ECMP) for network layer forwarding and/or link aggregation data-link layer forwarding may be supported. When ECMP or link aggregation is used, the forwarding determination may resolve to a group of ports, providing multiple next-hop entries to choose from. In such embodiments, load-balancing logic may be performed to determine the destination port in the group to which to forward the network data unit. While logic for unicast forwarding is described above, multicast forwarding may be performed in a manner similar to when performing ECMP or link aggregation, excepting that the data unit may be broadcast to multiple ports in a group of ports. In some embodiments, this may be performed by having the forwarding destination resolve to a multicast ID that provides an index into a table that indicates the output interfaces for a given multicast stream. HWFE 312 may also support virtual routing and forwarding (VRF).

Ingress data pipeline 301 includes logic for an ingress traffic manager 306 responsible for queuing and scheduling of network data after data-link layer or network layer forwarding decisions have been made. Ingress traffic manager 306 may queue incoming units of network data within VOQs stored in ingress buffers 310. Each VOQ is associated with an egress port, and the packet is forwarded when the proper egress port is ready. VOQs in each ingress data pipeline 301 may be arbitrated by egress traffic manager 306. For instance, arbitration of a VOQ may performed via a credit request/grant loop. Network data units, such as packets, may be queued in ingress buffers 310 within a set of VOQs until an egress scheduler, e.g., egress traffic manager 322, issues a credit grant for a given unit of network data indicating the egress is ready to receive and transmit the packet. Once a credit is granted, ingress traffic manager 306 may then forward the network data unit, via forwarding fabric 330, to an egress data pipeline 303 at the network data unit's destination port. Ingress buffering and VOQs are typically used exclusively for unicast data traffic, as buffering replicated multicast data units at ingress buffers 310 is not as efficient as buffering multicast packets at each corresponding egress buffer; however, an ingress data pipeline may be reprogrammed to use ingress buffering and VOQs for certain multicast traffic in cases of egress buffer errors and network traffic bursts.

In ingress data pipeline 301, ingress buffers may include an on-chip buffer 311 stored in on-die or on-package memory of HWFE 312, as well as at least one external buffer 313 stored in external (e.g., chipset) memory, which may be coupled to HWFE 312. In some embodiments, each HWFE 312 may include a VOQ for each output port in the system. VOQs may be split between on-chip buffer 311 and external buffer 313, where units that are to be forwarded to uncongested output ports can be stored in on-chip buffer 311, while units waiting to be forward to congested ports can be stored in external buffer 313. However, embodiments are not limited to this configuration, as VOQs may be stored entirely in on-chip buffer 311 or entirely in external buffer 313 depending on system configuration.

In forwarding pipeline 300, when a forwarding decision is made for a unit of network data, ingress traffic manager 306 determines an appropriate VOQ to buffer the unit of network data until logic in the appropriate egress data pipeline (e.g., egress data pipeline 303, or an egress data pipeline in a different hardware forwarding engine) is ready to receive the unit of network data. In some embodiments, the appropriate VOQ for the unit of network data can be determined at least in part based on the destination port to which the unit of network data is to be forwarded, as at least one VOQ exists for each egress port.

HWFE 312 supports multiple traffic classes for use in implementing quality of service (QoS) policies, or other policy based forwarding techniques. In some embodiments, for example, 8 distinct traffic classes may be configured, and separate VOQs may be provided for each traffic class.

In forwarding pipeline 300, once the unit of network data is buffered in a VOQ, ingress data pipeline 301 (e.g., via ingress traffic manager 306) can request a scheduling credit from the forwarding engine that manages the destination port for the unit of network data. Once a scheduling credit is granted, ingress data pipeline 301 (e.g., via ingress transmit data processor 308) can forward the unit of network data across forwarding fabric 330 to the destination forwarding engine.

Forwarding fabric 330 may be a distributed forwarding fabric having multiple available paths between each of the forwarding engines. In such embodiments, ingress transmit data processor 308 may subdivide the data unit into variable sized cells and transmit the cells across all available crossbar elements within forwarding fabric 330. In some embodiments, for network data units having an ingress port and an egress port on the same forwarding engine (e.g., HWFE 312), the unit of network data may be locally switched to egress data pipeline 303 without transmitting data via forwarding fabric 330.

In forwarding pipeline 300, egress data pipeline 303 of HWFE 312 processes units of network data after the network data is forwarded. In some embodiments, locally forwarded network data, as well as network data received via forwarding fabric 330, may be processed by egress receive data processor 320. Egress receive data processor 320 may reassemble network data sliced by ingress transmit data processor 308 within ingress data pipeline 301 of ingress forwarding engine.

In a VOQ credit request/grant loop of forwarding pipeline 300, egress traffic manager 322 may grant VOQ scheduling credits to ingress traffic managers (e.g., ingress traffic manager 306). Egress traffic manager 322 may immediately grant scheduling requests made for uncongested output ports (e.g., output ports having empty or nearly empty queues in egress buffer 323). Egress traffic manager 322 may grant credits for congested ports, for example, within a traffic class, using a weighted round robin scheduler that grants fair bandwidth to each requesting VOQ within ingress data pipeline 301 of the requesting forwarding engine. In some embodiments, a scheduling algorithm may be configured to grant requests between traffic classes using the configured egress shaping and scheduling for the port. In some embodiments, a scheduling algorithm may be configured to grant requests within a traffic class for an output port among the different VOQs competing for credits based on a weighted round robin scheduler.

In some embodiments, egress traffic manager 322 may also manage egress buffering within a system via egress buffer 323. For instance, egress buffer 323 may be an on-chip buffer stored in on-die or on-package memory within HWFE 312. In some configurations, egress buffer 323 is primarily used for multicast traffic, as unicast traffic may be buffered primarily within various VOQs. In some embodiments, transmission of network data is managed via the egress transmit data processor 324, which can read buffered egress network data from the egress buffer 323 and transmit the network data via a port on the network interface 302.

Egress buffer 323 is used in both types of typical multicast packet replication—ingress-egress replication and fabric-egress replication. Generally, with multicast traffic, network interface 302 may receive a packet with a destination of a multicast group, and logic elements within forwarding pipeline 300 (e.g., ingress receive data processor 304) may look up and identify output ports belonging to the multicast group. For each destination output port associated with the multicast group, the packet must be replicated and forwarded.

Generally, fabric-egress replication is performed when processing multicast data. When multicast data units have a destination of an egress port on a different forwarding engine than the ingress port, the packets pass through the forwarding fabric 330 between the ingress data pipeline 301 and the egress data pipeline 303 during fabric-egress replication. In fabric-egress replication, a network interface 302 may receive a multicast packet at network interface 302 and ingress data pipeline 301 forwards the packet to forwarding fabric 330 for replication. With the packet in forwarding fabric 330, the network element identifies the destination output interfaces, replicates the packet, and forwards the copies to an egress data pipeline 303 of each identified destination output interface. Within each egress data pipeline 303 receiving a multicast packet from forwarding fabric 330, if multiple output ports within the interface belong to the multicast group, the packets can be further replicated and buffered in egress buffer 323.

In some embodiments, ingress-egress replication may be used. For instance, if one of the identified ports of the multicast group is on the same forwarding engine (e.g., HWFE 312) the packets would not need to leave the forwarding engine and ingress-egress replication may be used.

Utilizing fabric-egress replication with multicast traffic, egress replication buffering is generally preferred over ingress replication buffering, however, ingress-only replication may be used with multicast traffic. With ingress replication of multicast network data, ingress traffic manager 306 may replicate incoming units of network data and queue the replicated data units within virtual output queues (VOQs) stored in ingress buffers 310. Each replicated data unit is placed in the VOQ corresponding to an identified output port belonging to the multicast group. Once each replicated data unit is in the VOQs, each replicated data unit is treated as a unicast data unit and forwarded to the corresponding egress data pipeline for output via network interface 302.

While ingress replication can be used for multicast packet replication, there are several downsides. For instance, a copy of each replicated packet may be stored in ingress memory. Storing ingress-replicated packets in VOQ may consume ingress memory that could be otherwise used for unicast traffic. Replicating a packet and queueing duplicate packets in VOQ buffers may cause congestion at an ingress and hinder unicast traffic. Additionally, replicating a packet at an ingress buffer would require transmission of each copy from the ingress over a network element's fabric. The fabric would experience much higher data traffic. Using ingress replication and buffering for all multicast traffic is not as efficient as egress replication buffering, as transmitting only one packet through the fabric before replication can minimize memory and bandwidth use in multicast transmissions. Egress buffers, however, typically lack large resources and can fill up quickly with bursts of traffic during periods of congestion or traffic microbursts.

Forwarding pipeline 300 in a network element may temporarily switch from using egress replication buffering to ingress buffering, using VOQs, for multicast traffic during times of buffer error (or high risk of buffer error). In some embodiments, a network element may be configured to provide feedback and identify which ports drop packets by monitoring egress buffers and/or multicast traffic in real time. In some embodiments, egress buffer 323 may be configured to monitor and report errors such as buffer overflow. In some embodiments, egress buffer 323 and/or egress traffic manager 322 may communicate a feedback signal in real time (or near real time) of an error in order to initiate reprogramming a temporary switch from egress replication buffering to ingress replication buffering. Such a communication of an error (or high risk of error) from egress buffer 323 may be in a form of an interrupt signal sent to the control plane of a network element. In response to feedback identifying an egress buffer error (or high risk of error), a control plane processor (e.g., CPU) of a network element's control plane may reprogram all connected interface devices to temporarily switch from egress replication buffering to ingress replication buffering when forwarding network data with a destination of the output port corresponding to the identification of an egress buffer.

Figure 4:
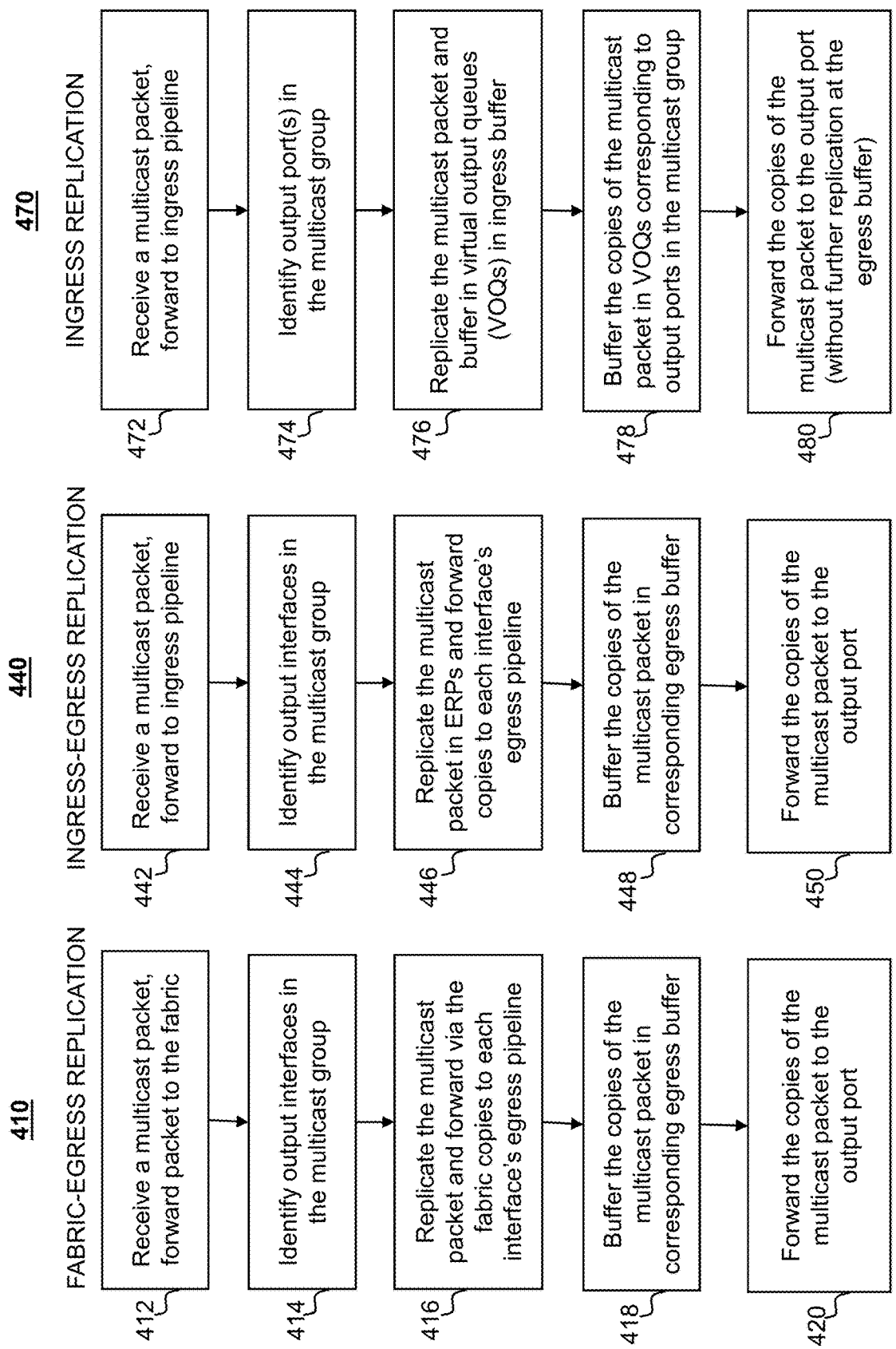
FIG. 4A depicts an illustrative flowchart of a process for a network element using fabric-egress replication buffering when handling multicast traffic, in accordance with some embodiments of the disclosure.
FIG. 4B depicts an illustrative flowchart of a process for a network element using ingress-egress replication buffering when handling multicast traffic, in accordance with some embodiments of the disclosure.
FIG. 4C depicts an illustrative flowchart of a process for a network element using ingress replication buffering when handling multicast traffic, in accordance with some embodiments of the disclosure.

FIG. 4A depicts an illustrative flowchart of a process for a network element using fabric-egress replication buffering when handling multicast traffic, in accordance with some embodiments of the disclosure. Process 410 includes steps for fabric-egress replication. Some embodiments may include, for instance, one or more forwarding engines, e.g., as part of a network element with input/output interfaces, carrying out the steps of process 410 depicted in the flowchart of FIG. 4A.

At step 412, an input port of the network element receives a multicast packet and forwards the packet to the fabric of the network element. With fabric-egress replication, a multicast packet may be stored in a fabric multicast queue (FMQ) prior to forwarding to the fabric. In some embodiments, a multicast packet may be pushed to a control plane processor (e.g., CPU 208 as depicted in FIG. 2). An FMQ resides in an ingress buffer like a VOQ, however, instead of using a credit request/grant loop, an FMQ only throttles release of packets from the queue if the fabric cannot keep up with traffic sent to it.

At step 414, the forwarding engine, e.g., an application specific integrated circuit (ASIC) in the fabric, and looks up and identifies output interfaces with ports that belong to the multicast group. An output interface, such as interface 206A depicted in FIG. 2, may comprise many output ports, such as ports 216A. The forwarding engine and/or CPU identifies, from the multicast group map, which interfaces include ports that belong to the multicast group. In some embodiments, the forwarding engine and/or CPU does not identify destination output ports but identifies interfaces that include destination ports. With multicast traffic, a network element may receive a packet with a destination of a multicast group, look up and identify output interfaces belonging to the multicast group in preparation to forward copies of the packet to each interface for further replication and forwarding to individual ports.

At step 416, the forwarding engine, e.g., the fabric and/or an ASIC in the fabric, replicates the multicast packet to generate copies of the multicast packet to be forwarded via the fabric to the egress pipeline of each identified output interface. For instance, if the forwarding engine and/or CPU determines an output interface includes an output port belonging to the multicast group, the packet replication is forwarded via the fabric to the output interface for egress processing. In some embodiments, if an output interface includes multiple destination output ports, the forwarding engine and/or CPU forwards only one copy of the packet to that output interface (and the packet is further replicated) rather than forwarding multiple packets across the fabric.

At step 418, the forwarding engine of an output interface receives the replicated packet and buffers it in the egress buffer corresponding to a destination output port. In some embodiments, an ASIC, such as processor 214C on interface 206C in FIG. 2, may perform a lookup to determine the destination port on the interface that belongs to the multicast group, and replicate and buffer multicast packet for the port. In some embodiments, an ASIC may identify multiple destination ports belonging to the multicast group during the lookup and then replicate and buffer multicast packets for each port on the interface in the multicast group. A copy of the multicast packet may be buffered in a queue in the egress buffer at each destination output port belonging to the multicast group.

At step 420, the forwarding engine forwards each copy of the multicast packet from the egress buffer to the output port, which is then forwarded to the device connected to the output port. Then the network element receives the next multicast packet to be forwarded to the output port, and one of processes 410, 440, and/or 470 is performed.

FIG. 4B depicts an illustrative flowchart of a process for a network element using ingress-egress replication buffering when handling multicast traffic, in accordance with some embodiments of the disclosure. Process 440 includes steps for ingress-egress replication. Some embodiments may include, for instance, one or more forwarding engines, e.g., as part of a network element with input/output interfaces, carrying out the steps of process 440 depicted in the flowchart of FIG. 4B. A forwarding engine, for instance, may be a component of a network element interface, such as one or more packet transmit/receive processors. A forwarding engine may be a hardware forwarding engine such as HWFE(s) 212A-C in FIG. 2 and/or HWFE 312 in FIG. 3.

At step 442, an input port of the network element receives a multicast packet and forwards the packet to the ingress pipeline within a forwarding engine.

At step 444, the network element looks up and identifies output interfaces with ports that belong to the multicast group. An output interface, such as interface 206A depicted in FIG. 2, may comprise many output ports, such as ports 216A. The CPU identifies, from the multicast group map, which interfaces include ports that belong to the multicast group.

At step 446, the forwarding engine replicates the multicast packet to generate copies of the multicast packet to be forwarded to the egress pipeline of each identified output interface. With ingress-egress replication, a multicast packet may be stored in logical egress replication ports (ERPs), where each ERP represents an egress interface to which the replicated packet will be forwarded. In some embodiments, each ERP may have a VOQ associated with it.

At step 448, the forwarding engine of an output interface receives the replicated packet and buffers it in the egress buffer corresponding to a destination output port. In some embodiments, an ASIC may perform a lookup to determine the destination port(s) on the interface that belongs to the multicast group, and replicate and buffer multicast packet for the port(s). A copy of the multicast packet may be buffered in a queue in the egress buffer at each destination output port belonging to the multicast group.

At step 450, the forwarding engine forwards each copy of the multicast packet from the egress buffer to the output port, which is then forwarded to the device connected to the output port. Then the network element receives the next multicast packet to be forwarded to the output port, and one of processes 410, 440, and/or 470 is performed.

FIG. 4C depicts an illustrative flowchart of a process for a network element using ingress replication buffering when handling multicast traffic, in accordance with some embodiments of the disclosure. Process 470 includes steps for ingress replication. Some embodiments may include, for instance, one or more forwarding engines, e.g., as part of a network element with input/output interfaces, carrying out the steps of process 470 depicted in the flowchart of FIG. 4C.

At step 472, an input port of the network element receives a multicast packet and forwards the packet to the ingress pipeline within a forwarding engine. With multicast traffic, a network element may receive a packet with a destination of a multicast group, look up and identify output ports belonging to the multicast group.

At step 474, the network element looks up and identifies output ports belonging to the multicast group.

At step 476, the forwarding engine replicates the multicast packet to generate copies of the multicast packet to be buffered in virtual output queues (VOQs) of the ingress buffer, where each queue represents a destination output port.

At step 478, the forwarding engine buffers the copies of the multicast packet in the ingress buffer. Copies of the multicast packet are buffered in queue(s) corresponding to destination output ports in the multicast group.

At step 480, the forwarding engine forwards each copy of the multicast packet from each VOQ at the ingress buffer to the output port, without replicating the multicast packet at the corresponding egress buffer. The packet may be stored in the egress buffer momentarily, but the packet is not replicated at the egress, and is quickly forwarded to the device connected to the output port. Then the network element receives the next multicast packet to be forwarded to the output port, and one of processes 410, 440, and/or 470 is performed.

Figure 5:
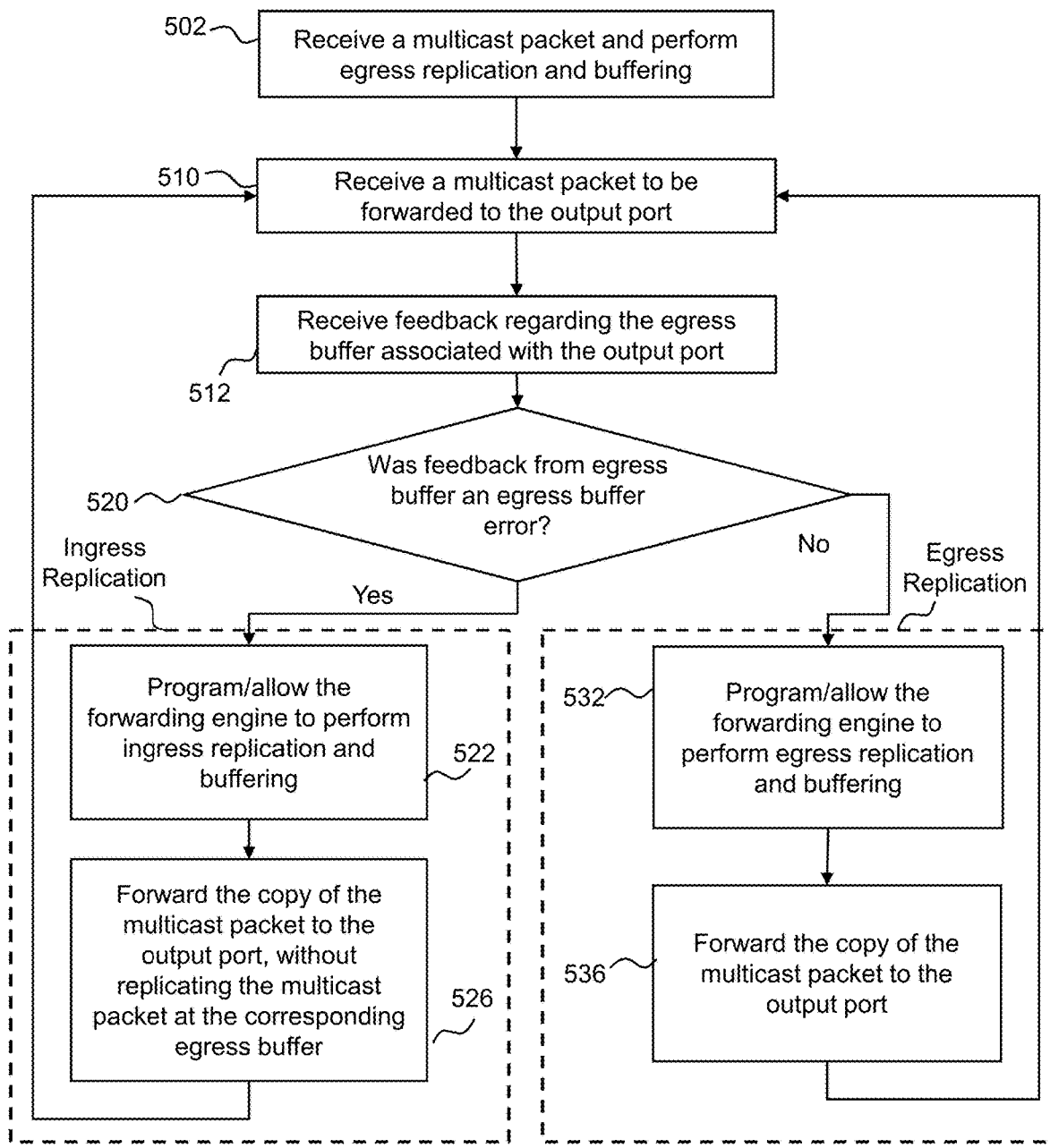
FIG. 5 depicts an illustrative flowchart of a process for reprogramming a network element forwarding multicast traffic, in accordance with some embodiments of the disclosure.

FIG. 5 depicts an illustrative flowchart of a process for reprogramming a network element to avoid using egress replication buffering when handling multicast traffic in the event of an egress buffer error on an output port, in accordance with some embodiments of the disclosure. Some embodiments may include, for instance, one or more forwarding engines, e.g., as part of a network element with input/output interfaces, carrying out the steps of process 500 depicted in the flowchart of FIG. 5.

At step 502, an input port of the network element receives a multicast packet. At this point there has been no feedback of egress buffer error or network congestion that may cause egress buffer error. Accordingly, replication of a multicast packet typically takes place at egress buffers corresponding to the destination ports. Egress replication is typically done in one of two ways: fabric-egress replication and ingress-egress replication. For instance, in some embodiments, fabric-egress replication (e.g., process 410 of FIG. 4A) may be performed, and the replicated packet passes through the fabric of the network element. To determine a destination address for network data, the destination information for that multicast group is stored in one or more tables in the data plane. In some embodiments, ingress-egress replication (e.g., process 440 of FIG. 4B) may be performed. In either type of egress replication, by transmitting only one packet through the fabric before replicating at the egress, egress replication buffering may minimize memory and bandwidth use in multicast transmissions. After the replicated multicast packet is stored in the egress buffer, it may be output by the interface.

An exemplary multicast group of the packet received at step 502, for instance, may be originally programmed as follows:
MC_ID 1
  Buffer mode: fabric-egress replication
  Ingress chains:
    ASIC1 ingress chain: FMQ, CPU
    ASIC2 ingress chain: FMQ, CPU
  Fabric/mesh bitmap: ASIC1, ASIC2
  Egress chains:
    ASIC1 egress chain: Et1, Et2
    ASIC2 egress chain: Et20, Et21

A forwarding engine looks up the associated ingress chains in response to receiving a multicast packet with the multicast group identification as "MC_ID 1." The buffer mode is fabric-egress replication (e.g., process 410 of FIG. 4A). An ASIC is an application specific integrated circuit within the forwarding engine of, e.g., an egress interface with output ports belonging to the multicast group. Et1, Et2, Et20, Et21 are output ports. FMQ refers to a fabric multicast queue. An FMQ resides in an ingress buffer like a VOQ, however, instead of using a credit request/grant loop, an FMQ only throttles release of packets from the queue if the fabric cannot keep up with traffic sent to it.

In this case, multicast packets belonging to MC_ID 1, received by the ingress ports associated with ASIC1 or ASIC2, are forwarded to the FMQ prior to being forwarded to the fabric. In this example, multicast packets may be forwarded directly to the CPU instead of or in addition to being forwarded to the fabric. The CPU, e.g., CPU 208 of network element 200 as depicted in FIG. 2, controls the forwarding pathway and uses a mesh bitmap of the fabric to identify that ASIC 1 and ASIC 2 are each associated with destination ports belonging to MC_ID 1. In this example, ASIC 1 may be depicted in FIG. 2 as processor 214A and ASIC 2 may be depicted as processor 214B. From the FMQ, the multicast packet is copied in the fabric and forwarded to egress interfaces associated with each of ASIC1 and ASIC2. The replicated packets received by ASIC1 are forwarded to output ports Et1, Et2 after replication and buffering via fabric-egress replication (e.g., process 410 of FIG. 4A). Likewise, replicated packets received by ASIC2 are forwarded to output ports Et20, Et21 after replication and buffering via fabric-egress replication.

At step 510, the input port of the network element receives a second multicast packet. In process 500, the second multicast packet shares a multicast group with the first multicast packet and, therefore, includes the same output port as a destination. To determine this, the network element may look up and identify output ports belonging to the multicast group in one or more tables in the data plane. The second multicast packet may include destinations other than the same output port.

At step 512, prior to or during ingress of the multicast packet, the forwarding engine receives feedback from the egress buffer associated with the destination output port. In some embodiments, feedback may be an interrupt sent by hardware to indicate an error such as buffer overflow. An interrupt may inform a CPU, such as a control plane processor, in real time about an egress buffer overflow on a specific port. In some embodiments, feedback may identify a near real-time probability of potential error. For example, network traffic monitoring, such as capturing packets or mirroring traffic, may provide feedback of traffic bursts. Some embodiments may use a combination of different forms of feedback.

At step 520, in response to receiving feedback, the forwarding engine determines whether the received feedback from an egress buffer was an egress buffer error. In some embodiments, this determination may be a determination of risk of experiencing a buffer overflow error based on monitoring network traffic. Communication of feedback, such as the presence (or lack) of or a risk-level of a buffer error may occur via the control plane of the network element. A control plane, such as control plane 204 depicted in FIG. 2, may include a control plane processor (e.g., CPU) and memory, as well as a policy engine, and is able to communicate with interface devices of the network element. A CPU may reprogram forwarding engines to function under different rules or policies, such as replicating or forwarding packets in a different manner for a duration.

In embodiments where an interrupt informs a CPU in real time about an egress buffer overflow (or risk of a buffer error) on a specific port, the CPU can reprogram a network element to avoid using egress replication buffering when handling multicast traffic. By responding to feedback, especially with real-time or near real-time feedback, a network element may be reprogrammed to use multicast ingress replication in lieu of egress replication only as needed (e.g., in the event of a buffer error on the relevant output port) to optimize the limited ingress and egress buffer resources.

In the exemplary multicast group, MC_ID 1, ASIC2 may generate the following interrupt as feedback:
    EgressBufferOverflow: Et20
In this case, an interrupt informs the CPU in real time about egress buffer overflow at port Et20. With this information, the CPU can reprogram multicast groups to avoid using egress buffers in situations that that might cause error conditions, e.g., during traffic bursts.

At step 522, for instance, a network element may begin to use ingress-only replication buffering (e.g., process 470 of FIG. 4C) for multicast traffic destined to a port experiencing a buffer error. Substituting ingress buffer replication for egress buffer replication upon detection of buffer overflow would allow the egress buffer to empty but may be needed for periods longer than that needed to clear the error, such as during network traffic bursts. In some embodiments, ingress buffer replication may substitute egress buffer replication for the problematic port or a group (or sub-group) of ports in the multicast group associated with the port producing the error. Transmitting many copies of multicast packets across the fabric of a network element could, however, burden resources and disturb unicast network traffic, so ingress buffer replication should not be endless and, in many cases, should be reprogrammed from egress buffer replication only for a limited number of ports.

At step 526, the forwarding engine forwards the copy of the multicast packet from the VOQ at the ingress buffer to the output port, without replicating the multicast packet at the corresponding egress buffer. The packet may be stored in the egress buffer momentarily, but the packet is not replicated at the egress, and is quickly forwarded to the device connected to the output port. Then the network element receives the next multicast packet to be forwarded to the output port, e.g., at step 510, and the process repeats with a next multicast packet.

There are several ways exemplary multicast group MC_ID 1 could be reprogrammed in order to avoid using egress buffers after an egress buffer produced an error. For instance, a network element could eliminate egress replication and buffering for any output port. That approach may inhibit other network traffic, such as unicast traffic. A dynamic, discriminating way would be to reprogram multicast groups that include only Et20 as a destination, e.g., for a limited duration. For instance, MC_ID 1 could be programmed for all replication destinations to use ingress replication:
MC_ID 1
    Buffer mode: ingress-only replication
    Ingress chains:
        ASIC1 ingress chain: Et1, Et2, Et20, Et21, CPU
        ASIC2 ingress chain: Et1, Et2, Et20, Et21, CPU
With ingress-only, multicast packets in MC_ID 1 are forwarded to output ports Et1, Et2, Et20, Et21 after ingress replication (e.g., process 470 of FIG. 4C) when received by ASIC1 or ASIC2.

Alternatively, MC_ID 1 could be reprogrammed after receiving an interrupt of "EgressBufferOverflow: Et20" for only traffic to Et20 to use ingress replication:
MC_ID 1
    Buffer mode: fabric-egress replication (except when output is Et20)
    Ingress chains
        ASIC1 ingress chain: Et20, FMQ, CPU
        ASIC2 ingress chain: Et20, FMQ, CPU
    Fabric/mesh bitmap: ASIC1, ASIC2
    Egress chains:
        ASIC1 egress chain: Et1, Et2
        ASIC2 egress chain: Et21
In this case, multicast packets belonging to MC_ID 1, received by the ingress ports associated with ASIC1 or ASIC2, are forwarded to the FMQ prior to being forwarded to the fabric. The CPU controls the pathway the packets will be forwarded and uses a mesh bitmap of the fabric to identify that ASIC 1 and ASIC 2 are each associated with egress interfaces with destination ports belonging to MC_ID 1. From the FMQ, the multicast packet is copied in the fabric and forwarded to egress interfaces associated with each of ASIC1 and ASIC2. The replicated packets received by ASIC1 are forwarded to output ports Et1, Et2 after replication and buffering via fabric-egress replication (e.g., process 410 of FIG. 4A). Likewise, multicast packets in MC_ID 1 received by ASIC2 are forwarded to output port Et21 (but not Et20) after replication and buffering via fabric-egress replication. This reprogramming of MC_ID 1 would not affect ports Et1, Et2, Et21 because of a buffer overflow error at Et20.

If the received feedback from an egress buffer was not an egress buffer error, then at step 532, the forwarding engine replicates the multicast packet to generate a copy of the multicast packet. Moreover, the received feedback could indicate that the risk of buffer error for the port is low and the multicast group should be reprogrammed back to egress buffer replication. Exemplary multicast group MC_ID 1 may be automatically reprogrammed to its original ingress and egress chains upon removal of the interrupt of "Egress-BufferOverflow: Et20." After programming the exemplary multicast group to the original state, multicast packets in MC_ID 1 received by ASIC2 are forwarded to output ports Et20, Et21 after replication and buffering for fabric-egress replication. In some embodiments, the exemplary multicast group MC_ID 1 may be automatically programmed back to the original state after a specific time limit, e.g., 30 seconds, 10 minutes, 2 hours, etc., from receiving the interrupt.

At step 536, the forwarding engine forwards the copy of the multicast packet from the egress buffer to the output port. Then the network element receives the next multicast packet to be forwarded to the output port, e.g., at step 510, and the process repeats with a next multicast packet.

Exemplary Data Processing System and Modular Network Element

Figure 6:
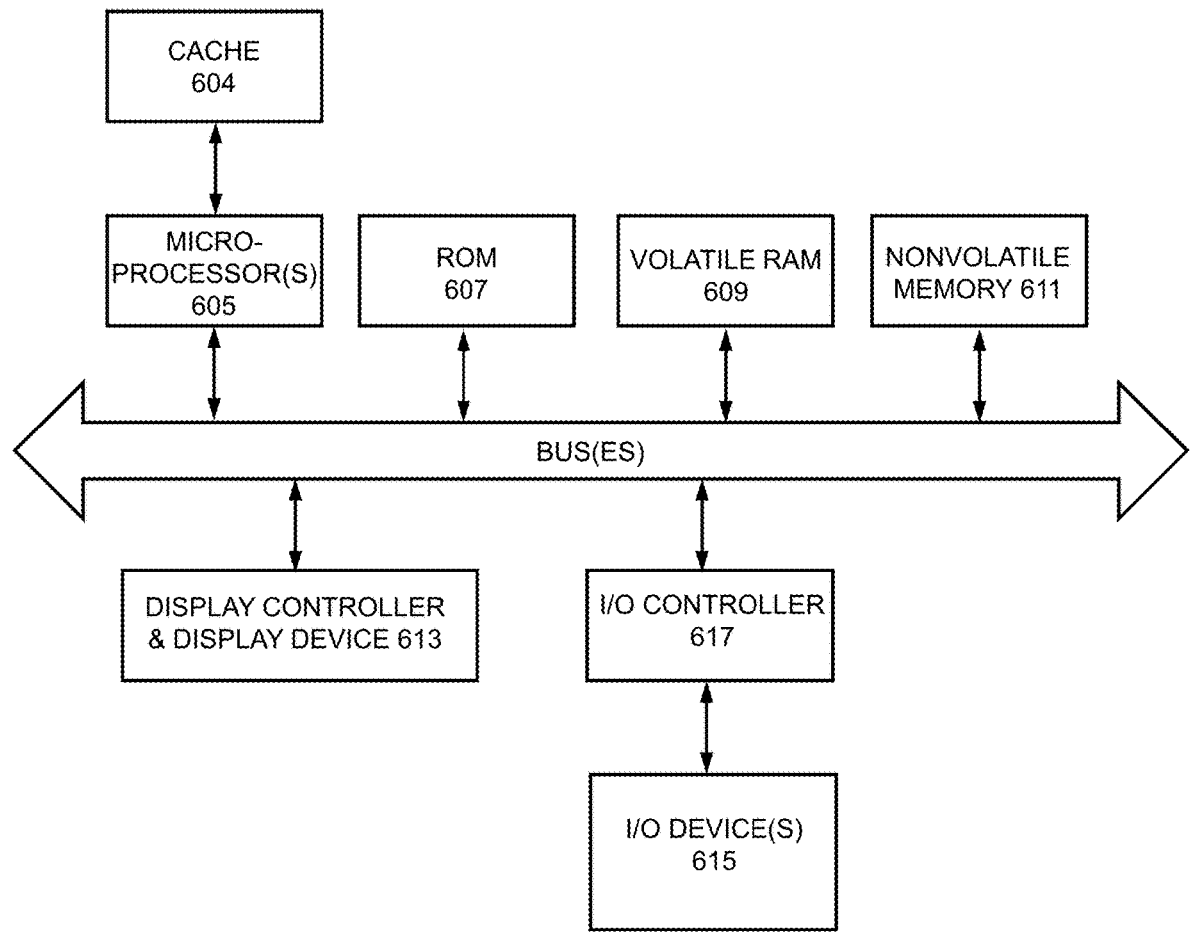
FIG. 6 depicts an illustrative block diagram of a data processing system, in accordance with some embodiments of the disclosure.

FIG. 6 depicts an illustrative block diagram of a data processing system 600, in accordance with some embodiments of the disclosure. For example, data processing system 600 may be implemented within one or more of network element 102 as depicted in FIG. 1 or network element 200 as depicted in FIG. 2. In some embodiments, data processing system 600 may be used within a control plane of a network element described herein. Note that while FIG. 6 illustrates various components of a computer system, it may not be intended to represent any particular architecture or manner of interconnecting components as such details are not germane to the present invention. It will also be appreciated that network computers and other data processing systems or other consumer electronic devices, which have fewer components or perhaps more components, may also be used with the present invention.

Data processing system 600 may include one or more bus(es) 603, which couple to one or more microprocessor(s) 605, ROM (Read Only Memory) 607, volatile RAM (Random Access Memory) 609 and a non-volatile memory 611. In some embodiments, one or more microprocessor(s) 605 couple to a cache 604, which can include one or more sets of instruction and/or data caches. Bus(es) 603 may include one or more buses connected to each other through various bridges, controllers and/or adapters.

Microprocessor(s) 605 may retrieve instructions from memories 607, 609, 611 and execute instructions to perform operations described above. Instructions and/or associated data retrieved from memories 607, 609, 611 may be stored in cache 604. Bus(es) 603 interconnect system components with each other, and to a display controller and display device 613, and to peripheral devices such as input/output (I/O) devices, which may be mice, keyboards, modems, network interfaces, printers and other devices. Typically, input/output devices 615 are coupled to a system via input/output controller(s) 617. Volatile RAM 609 may be typically implemented as dynamic RAM (DRAM), which requires power continually in order to refresh or maintain data in memory, but may also include static ram (SRAM), which does not require a periodic refresh.

In some embodiments, non-volatile memory 611 may be used at least in part as mass storage, which typically may include one or more of a magnetic hard drive, a magnetic optical drive, an optical drive, flash memory, or other types of memory systems, which maintain data after power may be removed from the system. Typically, a mass storage portion of non-volatile memory 611 will also be a random access memory, although this may not be required. While FIG. 6 shows that non-volatile memory 611 may be a local device coupled directly to other components in data processing system 600, some embodiments may utilize a non-volatile memory which may be remote, such as a network storage device which may be coupled to data processing system 600 via network interface such as a modem, an Ethernet interface, and/or a wireless network.

Portions of what is described above may be implemented with logic circuitry such as a dedicated logic circuit or with a microcontroller or other form of processing core that executes program code instructions. Thus, some embodiments may be performed with program code such as machine-executable instructions, which cause a machine that executes instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer-readable storage medium, such as, but may not be limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine-readable medium may include any mechanism for storing or transmitting information in a form readable by a machine (e.g., a computer). For example, a machine readable medium may include read only memory ("ROM"), random access memory ("RAM"), magnetic disk storage media, optical storage media, flash memory devices, etc.

An article of manufacture may be used to store program code. An article of manufacture that stores program code may be embodied as, but may not be limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 7:
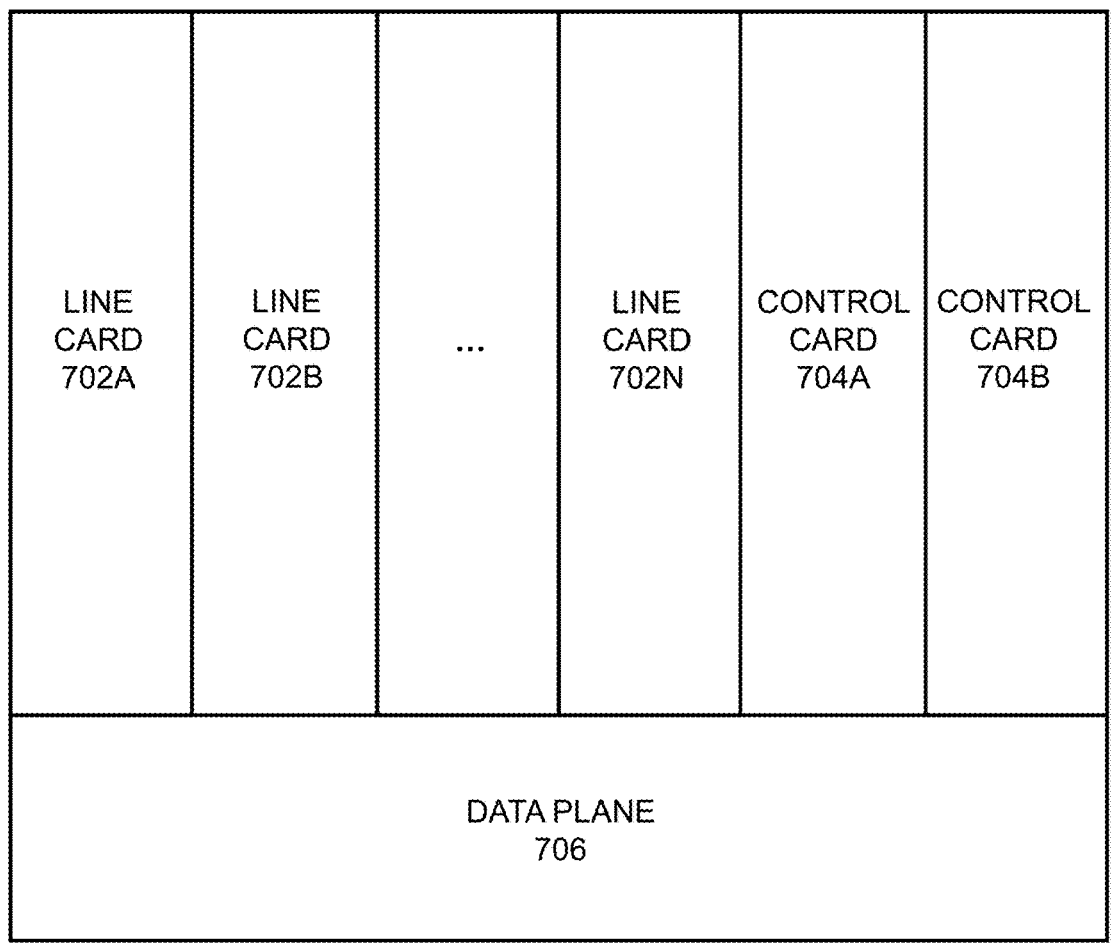
FIG. 7 depicts an illustrative block diagram of an additional embodiment of an exemplary modular network element as described herein.

FIG. 7 depicts a block diagram of an additional embodiment of an exemplary modular network element 700 as described herein. In some embodiments, network element 700 may have a modular and expandable configuration that allows addition or removal of resources configured as line cards 702A-N or controller cards 704A-B coupled to data plane 706. In some embodiments, controller cards 704A-B control traffic processing by line cards 702A-N, which can each include one or more network data forwarding devices such as interface devices 206A-C as depicted in FIG. 2, although the precise nature of forwarding devices is not limited as such. In addition, controller card 704A-B can collect and possibly aggregate timing data as described in FIG. 6 above. In some embodiments, line cards 702A-N process and forward traffic according to network policies received from controller cards 704A-B. In some embodiments, one or more of line cards 702A-N can monitor and report internal performance data, such as latency data for all or selected units of network data traversing network element 700. In some embodiments, controller cards 704A-B can also be configured to perform some or all functions provided by line cards 702A-N. In addition, controller card 704A-B may perform control plane policing using VOQs for control plane network data message classes, as discussed above. The architecture the network element 700 illustrated in FIG. 7 is exemplary, and different combinations of cards may be used in some embodiments.

The preceding detailed descriptions are presented in terms of algorithms and symbolic representations of operations on data bits within a computer memory. These algorithmic descriptions and representations are the tools used by those skilled in data processing art to most effectively convey the substance of their work to others skilled in the art. An algorithm may be here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it may be appreciated that throughout the description, discussions utilizing terms such as "measuring/storing," "receiving," "determining," "transmitting," "sending," "forwarding," "detecting," "gathering," "dropping," "communicating," "canceling/applying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description above. In addition, software aspects of the various embodiments are not described with reference to any particular programming language. It will be appreciated that a variety of programming languages may be used to implement the teachings described herein.

In the description above and in the claims below, the terms "coupled" and "connected," along with their derivatives, may be used. It should be understood that these terms are not intended as synonyms for each other. "Coupled" may be used to indicate that two or more elements, which may or may not be in direct physical or electrical contact with each other, cooperate or interact with each other. "Connected" may be used to indicate the establishment of communication between two or more elements that are coupled with each other. Additionally, the terms "server," "client," and "device" are intended to refer generally to data processing systems rather than specifically to a particular form factor for the server, client, and/or device.

Specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine, cause the machine to performs acts of the method, or of an apparatus or system according to embodiments and examples described herein. Additionally, various components described herein can be a means for performing the operations or functions described in accordance with an embodiment.

To minimize the harmful impact of lost network elements, embodiments described herein provide for a network element having logic to quickly identify when a network element may be mis-forwarding traffic, allowing corrective action to be taken.

Some embodiments provide for a non-transitory machine-readable medium storing instructions which, when executed by one or more processors, cause the one or more processors to perform operations to program a substitution of ingress replication buffering for egress replication buffering after identifying egress buffer errors (such as overflow) for multicast traffic. A network element may be configured to identify which ports drop packets by monitoring egress buffers and/or multicast traffic in real time. A hardware forwarding engine provides feedback to a control plane processor of the network element to adapt and selectively reprogram multicast ingress replication, temporarily, for certain egress ports that may have, e.g., egress buffer errors or risk of issues due to high network traffic. Using virtual output queues in ingress buffers may reduce risk of egress port congestion, as egress buffers have more limited resources than ingress buffers; however, relying solely on ingress replication for multicast traffic may hinder unicast traffic. Ingress buffer replication of multicast traffic may be used selectively and temporarily.

While the foregoing discussion describes exemplary embodiments of the present invention, one skilled in the art will recognize from such discussion, the accompanying drawings, and the claims, that various modifications can be made without departing from the spirit and scope of the invention. Therefore, the illustrations and examples herein should be construed in an illustrative, and not a restrictive sense. The scope and spirit of the invention should be measured solely by reference to the claims that follow.

What is claimed is:

1. A method for substituting multicast packet ingress replication for egress replication after an egress buffer error, the method comprising:

receiving, by an input port of the network element, a first multicast packet;

replicating the first multicast packet using egress replication to generate a copy of the first multicast packet for an egress port;
buffering the copy of the first multicast packet in an egress buffer;
receiving feedback of an egress buffer error;
receiving, by the input port, a second multicast packet and, in response to the received feedback:
  replicating the second multicast packet to generate a copy of the second multicast packet;
  buffering the copy of the second multicast packet in an ingress buffer associated with the input port; and
  forwarding the copy of the second multicast packet to the egress port without egress replication of the second multicast packet.

2. The method of claim 1, the method further comprising:
receiving second feedback of a lack of an egress buffer error;
receiving, by the input port, a third multicast packet and, in response to the received second feedback:
  replicating the third multicast packet to generate a copy of the third multicast packet;
  buffering the copy of the third multicast packet in the egress buffer; and
  forwarding the copy of the third multicast packet to the egress port.

3. The method of claim 1, the method further comprising:
receiving, by the input port, a third multicast packet;
calculating a time between receiving the third multicast packet and receiving feedback of the egress buffer error;
determining if the calculated time is greater than a predetermined threshold and, in response to determining the calculated amount of time is greater than the predetermined threshold:
  replicating the third multicast packet to generate a copy of the third multicast packet;
  buffering the copy of the third multicast packet in the egress buffer; and
  forwarding the copy of the third multicast packet to the egress port.

4. The method of claim 1, wherein the ingress buffer associated with the input port may include a plurality of virtual queues, one of the plurality of virtual queues associated with the egress port.

5. The method of claim 1, wherein the feedback may include an interrupt signal including a buffer overflow error.

6. The method of claim 1, wherein the egress buffer may include a queue.

7. A method for substituting multicast packet ingress replication for egress replication after an egress buffer error, the method comprising:
receiving feedback of an egress buffer error;
in response to receiving the feedback, reprogramming a packet processor to perform ingress replication;
receiving, by an input port of the network element, a multicast packet;
replicating the multicast packet to generate a copy of the multicast packet;
buffering the copy of the multicast packet in an ingress buffer associated with the input port; and
forwarding the copy of the multicast packet to an egress port without egress replication of the multicast packet.

8. The method of claim 7, the method further comprising:
replicating the multicast packet, by a second packet processor programmed to perform egress replication, to generate a second copy of the multicast packet;
buffering the second copy of the multicast packet in an egress buffer associated with a second egress port, the second egress port not associated with the egress buffer error; and
forwarding the copy of the second multicast packet to the second egress port.

9. The method of claim 7, the method further comprising:
receiving second feedback of a lack of an egress buffer error;
in response to the received second feedback, reprogramming the packet processor to perform egress replication;
receiving, by the input port, a second multicast packet;
replicating the second multicast packet to generate a copy of the second multicast packet;
buffering the copy of the second multicast packet in the egress buffer; and
forwarding the copy of the second multicast packet to the egress port.

10. The method of claim 9, wherein the egress buffer may include a queue.

11. The method of claim 7, the method further comprising:
receiving, by the input port, a second multicast packet;
calculating a time between receiving the second multicast packet and receiving feedback of the egress buffer error;
determining if the calculated time is greater than a predetermined threshold and, in response to determining the calculated amount of time is greater than the predetermined threshold, reprogramming the packet processor to perform egress replication;
replicating the second multicast packet to generate a copy of the second multicast packet;
buffering the copy of the second multicast packet in the egress buffer; and
forwarding the copy of the second multicast packet to the egress port.

12. The method of claim 7, wherein the ingress buffer associated with the input port may include a plurality of virtual queues, one of the plurality of virtual queues associated with the egress port.

13. The method of claim 7, wherein the feedback may include an interrupt signal including a buffer overflow error.

14. A network element comprising:
an input port to receive a multicast packet;
input/output circuitry configured to receive feedback of an egress buffer error associated with an egress port;
an input packet processor coupled with the input port, the input packet processor configured to replicate the multicast packet to generate a copy of the multicast packet in response to the input/output circuitry receiving the feedback; and
an ingress buffer coupled to the input port, the ingress buffer configured to buffer the copy of the multicast packet prior to the input packet processor forwarding the copy of the multicast packet to an egress port without egress replication of the multicast packet.

15. The network element of claim 14, wherein the input/output circuitry is further configured to receive second feedback of a lack of an egress buffer error associated with the egress port, and the input port is further configured to receive a second multicast packet.

16. The network element of claim 15, wherein the network element further comprises:
an egress packet processor coupled with the egress port, the egress packet processor configured to replicate the second multicast packet to generate a copy of the second multicast packet in response to the input/output circuitry receiving the second feedback; and an egress buffer coupled to the egress port, the output buffer configured to buffer the copy of the second multicast packet prior to the egress packet processor forwarding the copy of the second multicast packet to the egress port.

17. The network element of claim 14, the ingress buffer configured to include a plurality of virtual queues, one of the plurality of virtual queues associated with the egress port.

18. The network element of claim 14, wherein the feedback may include an interrupt signal including a buffer overflow error.

19. The network element of claim 16, wherein the egress buffer may include a queue.

20. The network element of claim 14, the network element further comprising:

the input port further configured to receive a second multicast packet;

the input packet processor further configured to calculate a time between the input port receiving the second multicast packet and the input/output circuitry further configured to receive feedback;

an egress packet processor coupled with the egress port, the egress packet processor configured to determine if the calculated time is greater than a predetermined threshold and, in response to determining the calculated amount of time is greater than the predetermined threshold, to replicate the second multicast packet to generate a copy of the second multicast packet; and the egress buffer configured to buffer the copy of the second multicast packet prior to the egress packet processor forwarding the copy of the second multicast packet to the egress port.

21. A method for substituting multicast packet ingress replication for egress replication after an egress buffer error, the method comprising:

receiving feedback of an egress buffer error associated with an egress port;

in response to receiving the feedback, reprogramming a packet processor to perform ingress replication for multicast traffic associated with the egress port;

receiving, by an input port of the network element, a multicast packet, the multicast packet intended for the egress port;

replicating the multicast packet to generate a copy of the multicast packet;

buffering the copy of the multicast packet in an ingress buffer associated with the input port; and forwarding the copy of the multicast packet to the egress port without egress replication at the egress port.

22. The method of claim 21, the method further comprising:

replicating the multicast packet to generate a second copy of the multicast packet;

buffering the second copy of the multicast packet in an egress buffer associated with a second egress port, the second egress port distinct from the egress port; and forwarding the copy of the second multicast packet to the second egress port.

* * * * *